United States Patent
Goncalves et al.

(10) Patent No.: US 9,445,155 B2
(45) Date of Patent: *Sep. 13, 2016

(54) GESTURE-BASED CONTENT SHARING

(71) Applicant: Google Technology Holdings LLC, Mountain View, CA (US)

(72) Inventors: Alex G. Goncalves, Sunnyvale, CA (US); Edward Judalevitch, Santa Clara, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 298 days.

This patent is subject to a terminal disclaimer.

(21) Appl. No.: 13/783,497

(22) Filed: Mar. 4, 2013

(65) Prior Publication Data

US 2014/0250475 A1  Sep. 4, 2014

(51) Int. Cl.
| | |
|---|---|
| *G06F 3/048* | (2013.01) |
| *G06F 3/02* | (2006.01) |
| *G06F 5/08* | (2006.01) |
| *H04N 21/472* | (2011.01) |
| *H04W 4/20* | (2009.01) |
| *G06F 1/16* | (2006.01) |
| *G06F 3/01* | (2006.01) |

(52) U.S. Cl.
CPC ...... *H04N 21/47202* (2013.01); *G06F 1/1694* (2013.01); *G06F 1/1698* (2013.01); *G06F 3/017* (2013.01); *H04W 4/206* (2013.01)

(58) Field of Classification Search
CPC .. H04L 29/08; H04N 21/47202; H04W 4/20
USPC ....... 345/156; 455/414.1; 715/753, 800, 863
See application file for complete search history.

(56) References Cited

U.S. PATENT DOCUMENTS

| | | | |
|---|---|---|---|
| 7,636,794 B2 | 12/2009 | Ramos et al. | |
| 8,260,883 B2 | 9/2012 | Mooring et al. | |
| 8,312,392 B2* | 11/2012 | Forutanpour | G06F 1/1694 715/733 |
| 8,339,363 B2* | 12/2012 | Krum | G06F 1/1626 345/158 |

(Continued)

OTHER PUBLICATIONS

Tushar Tajane, Hoccer Fun: Use Slide, Throw Gestures to Transfer Files Between iPhone, Android and Computer, http://techzoom.org/hoccer-fun-use-slide-throw-gestures-to-transfer-files-between-iphone-android-and-computer/, Jun. 6, 2011, all pages.

(Continued)

*Primary Examiner* — Kevin Bates
*Assistant Examiner* — Emad Siddiqi
(74) *Attorney, Agent, or Firm* — McDermott Will & Emery LLP

(57) ABSTRACT

A user selects a content item that he wishes to send. He then performs a gesture to specify a direction toward which the content item is to be sent. For example, he pretends to "throw" his portable communications device toward the West. To receive the content item, potential recipients also make gestures that specify receiving directions. For example, a recipient pretends to "catch" a ball thrown from the East. If the sending and receiving directions are compatible, then the content item is sent from the sender's device to the recipient's device. Enhancements to the basic scheme described above can be made to, for example, specify a dispersion angle for the sending or receiving directions or to include other restrictions so that, for example, only intended recipients can receive the content even if other potential recipients are in the specified sending direction and make appropriate receiving gestures.

15 Claims, 8 Drawing Sheets

(56) References Cited

U.S. PATENT DOCUMENTS

| | | |
|---|---|---|
| 2007/0146347 A1 | 6/2007 | Rosenberg |
| 2009/0017799 A1* | 1/2009 | Thorn .................... G06F 3/017 455/414.1 |
| 2009/0295753 A1 | 12/2009 | King et al. |
| 2011/0065459 A1 | 3/2011 | Cheng et al. |
| 2011/0088002 A1 | 4/2011 | Freer |
| 2011/0209098 A1 | 8/2011 | Hinckley et al. |
| 2011/0209104 A1 | 8/2011 | Hinckley et al. |
| 2012/0262379 A1 | 10/2012 | King |
| 2012/0282859 A1 | 11/2012 | Mayer et al. |
| 2013/0102324 A1* | 4/2013 | Qiu ....................... H04W 4/023 455/456.1 |
| 2013/0130758 A1* | 5/2013 | Moore .................... A63F 13/12 463/2 |
| 2014/0229858 A1* | 8/2014 | Bleker ................. H04W 4/206 715/753 |

OTHER PUBLICATIONS

Adi Robertson, 'Tangible' transfer concept would let you swipe files directly from MacBook to iPhone, http://www.theverge.com/2012/5/3/2996448/ishac-bertran-tangible-file-transfer-concept, Jun. 3, 2012, all pages.

Patent Cooperation Treaty, International Search Report and Written Opinion of the International Searching Authority for International Application No. PCT/US2014/012853, Apr. 7, 2014, 10 pages.

* cited by examiner

| 400 | Detect a receiving gesture specifying a receiving direction. |

| 410 | Receive a content item and a sending direction. |

| 406 | Optionally receive a device or user identifier. |

| 408 | Optionally receive a restriction element. |

| 412 | If the sending and receiving directions are compatible (and if the restriction elements, if any, are satisfied), then accept the received content item. |

FIG. 4b

GESTURE-BASED CONTENT SHARING

CROSS-REFERENCE TO RELATED APPLICATIONS

The present application is related to U.S. Patent Applications (Motorola Docket Numbers CS41090 and CS41377), filed on an even date herewith.

TECHNICAL FIELD

The present disclosure is related generally to media-content delivery and, more particularly, to social communications.

BACKGROUND

People are sharing more and more information electronically. They send e-mails and short text messages to friends and colleagues. Photographs, videos, and sound clips are often posted to social-networking sites. In social situations, people often want to quickly share photographs or other content with their friends.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

FIGS. 4a and 4b are flowcharts of representative methods for using a gesture to receive content.

DETAILED DESCRIPTION

Figure 1:
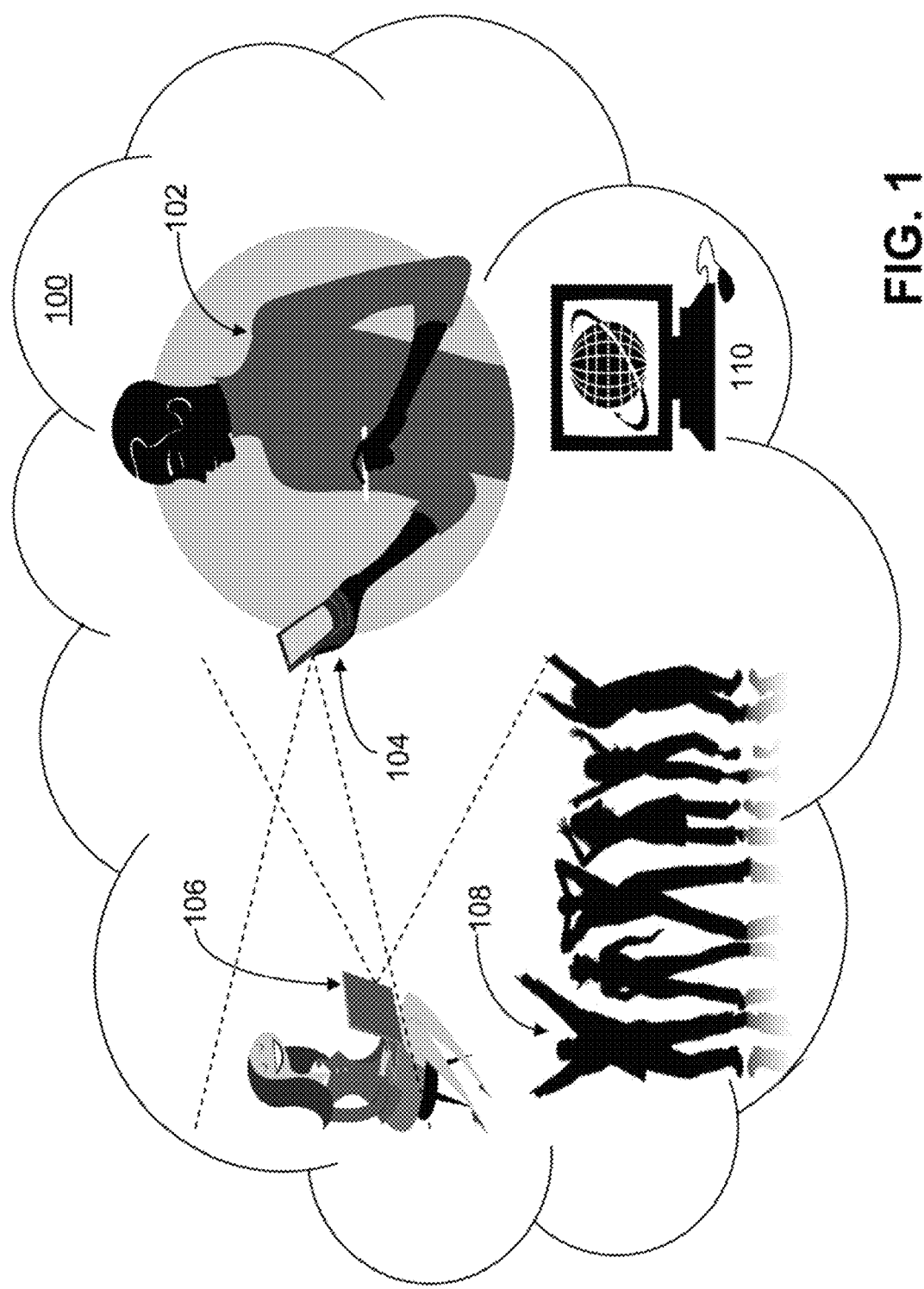
FIG. 1 is an overview of a representative environment in which the present techniques may be practiced.

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

While many content-sharing applications exist, they are often designed for personal computers that have large screens and a full keyboard. When a user wishes to, for example, send a photograph from his smartphone to a couple of friends in the same room, the limited user interface of the smartphone (small screen, very small or non-existent keyboard) makes these conventional content-sharing applications seem clumsy and intrusive. Also, most conventional content-sharing applications require the sender to navigate through the application's user interface once for each intended recipient.

Consider the communications environment 100 of FIG. 1. The user 102 wishes to send some content (e.g., a photograph) from his portable communications device 104 to his friend's device 106. According to aspects of the present disclosure, after selecting the content item that he wishes to send, the user 102 performs a gesture to specify a direction toward which the content item is to be sent. For example, he pretends to "throw" his device 104 (e.g., like throwing a ball or like throwing a flying disc) toward the West. To receive the content item, potential recipients also make gestures that specify receiving directions. For example, a potential recipient moves her device 106 to pretend to "catch" a ball thrown from the East. If the sending and receiving directions are compatible (as explained below), then the content item is sent from the sender's device 104 to the recipient's device 106.

Enhancements to the basic scheme described above can be made to, for example, specify a maximum sending distance or a dispersion angle for the sending or receiving directions (as shown by dotted lines in FIG. 1). A sending dispersion angle is specified by the sender 102 to exclude other people 108 from receiving the content. Other restrictions can be stated so that, for example, only intended recipients can receive the content even if other potential recipients are in the specified sending direction and make appropriate receiving gestures.

Figure 5A:
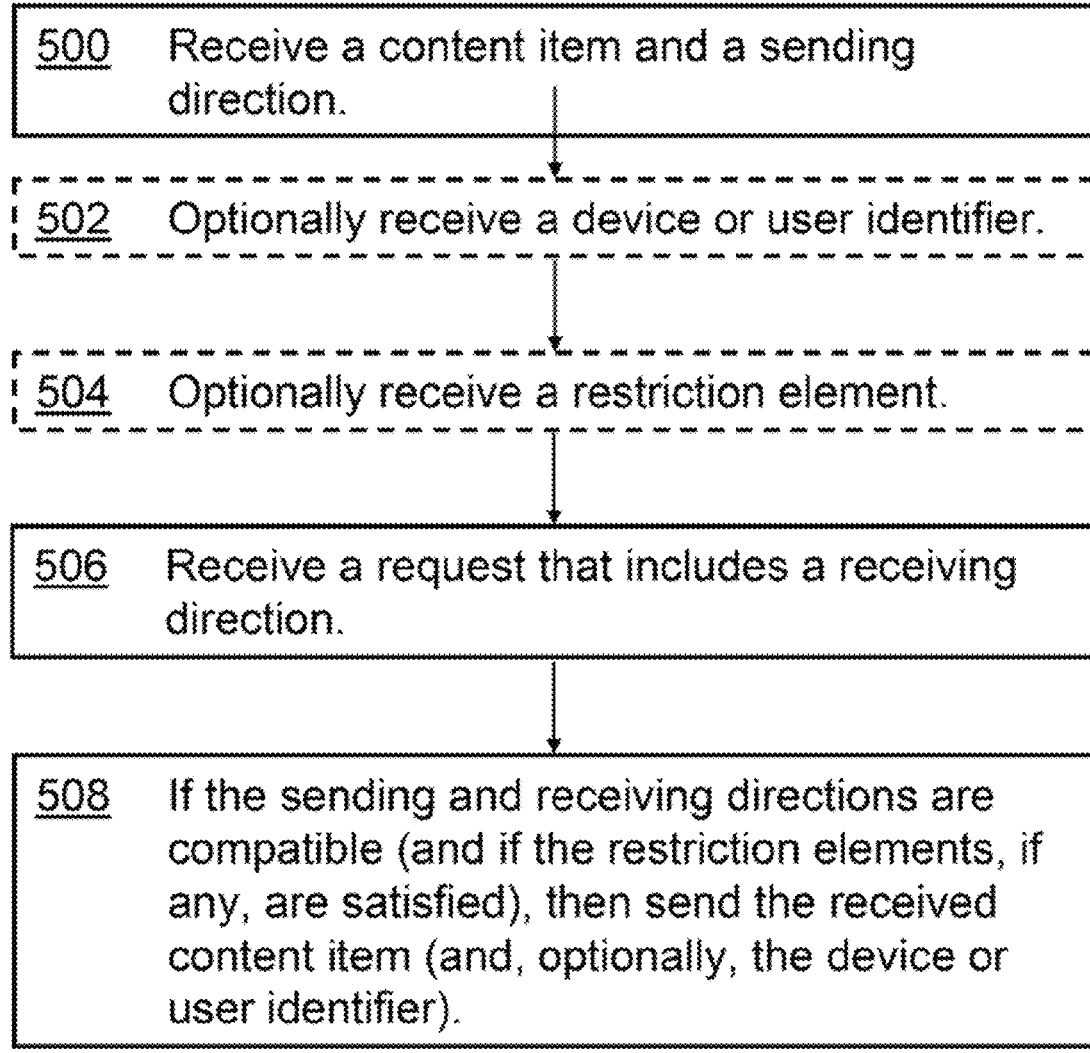
FIGS. 5a and 5b are flowcharts of representative methods usable by a server to transmit content.

The function of the optional content server 110 is discussed below with reference to FIGS. 5a and 5b.

Figure 2:
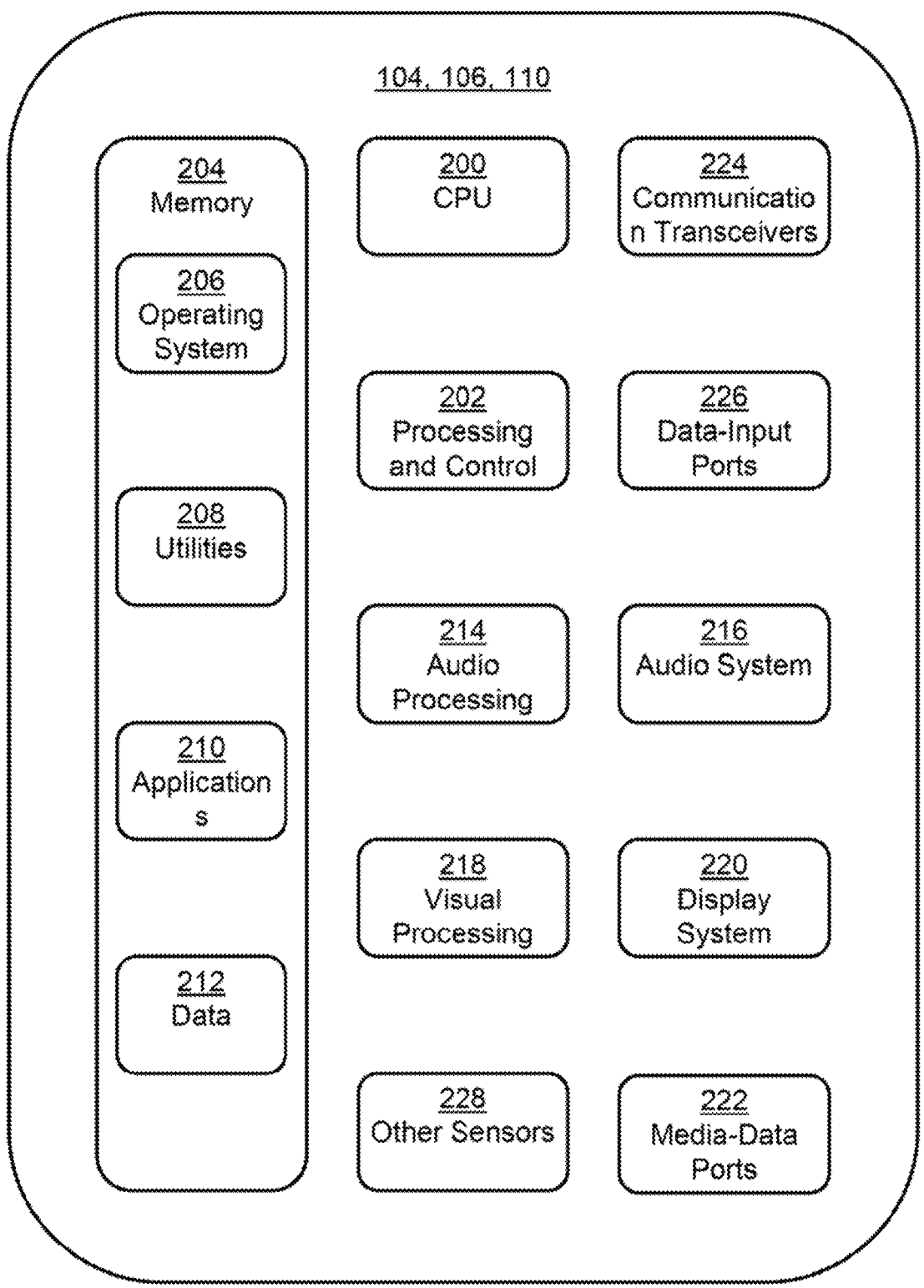
FIG. 2 is a generalized schematic of some of the devices of FIG. 1.

FIG. 2 shows the major components of a representative electronics device 104, 106, 110. A portable communications device 104, 106 could be, for example, a smartphone, tablet, personal computer, electronic book, or gaming controller. The content server 110 could be any of these and could also be a set-top box, a compute server, or a coordinated group of compute servers.

The CPU 200 of the electronics device 104, 106, 110 includes one or more processors (i.e., any of microprocessors, controllers, and the like) or a processor and memory system which processes computer-executable instructions to control the operation of the device 104, 106, 110. In particular, the CPU 200 supports aspects of the present disclosure as illustrated in FIGS. 3 through 5, discussed below. The device 104, 106, 110 can be implemented with a combination of software, hardware, firmware, and fixed-logic circuitry implemented in connection with processing and control circuits, generally identified at 202. Although not shown, the device 104, 106, 110 can include a system bus or data-transfer system that couples the various components within the device 104, 106, 110. A system bus can include any combination of different bus structures, such as a memory bus or memory controller, a peripheral bus, a universal serial bus, and a processor or local bus that utilizes any of a variety of bus architectures.

The electronics device 104, 106, 110 also includes one or more memory devices 204 that enable data storage, examples of which include random-access memory, non-volatile memory (e.g., read-only memory, flash memory, EPROM, and EEPROM), and a disk storage device. A disk storage device may be implemented as any type of magnetic or optical storage device, such as a hard disk drive, a recordable or rewriteable disc, any type of a digital versatile disc, and the like. The device 104, 106, 110 may also include a mass-storage media device.

The memory system 204 provides data-storage mechanisms to store device data 212, other types of information and data, and various device applications 210. An operating system 206 can be maintained as software instructions within the memory 204 and executed by the CPU 200. The device applications 210 may also include a device manager, such as any form of a control application or software application. The utilities 208 may include a signal-processing and control module, code that is native to a particular component of the electronics device 104, 106, 110, a hardware-abstraction layer for a particular component, and so on.

The electronics device 104, 106, 110 can also include an audio-processing system 214 that processes audio data and controls an audio system 216 (which may include, for example, speakers). A visual-processing system 218 processes graphics commands and visual data and controls a display system 220 that can include, for example, a display screen. The audio system 216 and the display system 220 may include any devices that process, display, or otherwise render audio, video, display, or image data. Display data and audio signals can be communicated to an audio component or to a display component via a radio-frequency link, S-video link, High-Definition Multimedia Interface, composite-video link, component-video link, Digital Video Interface, analog audio connection, or other similar communication link, represented by the media-data ports 222. In some implementations, the audio system 216 and the display system 220 are components external to the device 104, 106, 110. Alternatively (e.g., in a cellular telephone), these systems 216, 220 are integrated components of the device 104, 106, 110.

The electronics device 104, 106, 110 can include a communications interface which includes communication transceivers 224 that enable wired or wireless communication. Example transceivers 224 include Wireless Personal Area Network radios compliant with various IEEE 802.15 standards, Wireless Local Area Network radios compliant with any of the various IEEE 802.11 standards, Wireless Wide Area Network cellular radios compliant with 3GPP standards, Wireless Metropolitan Area Network radios compliant with various IEEE 802.16 standards, and wired Local Area Network Ethernet transceivers.

The electronics device 104, 106, 110 may also include one or more data-input ports 226 via which any type of data, media content, or inputs can be received, such as user-selectable inputs (e.g., from a keyboard, from a touch-sensitive input screen, or from another user-input device), messages, music, television content, recorded video content, and any other type of audio, video, or image data received from any content or data source. The data-input ports 226 may include USB ports, coaxial-cable ports, and other serial or parallel connectors (including internal connectors) for flash memory, storage disks, and the like. These data-input ports 226 may be used to couple the device 104, 106, 110 to components, peripherals, or accessories such as microphones and cameras.

Finally, the electronics device 104, 106, 110 may include any number of "other sensors" 228. These sensors 228 can include, for example, accelerometers, a GPS receiver, compass, magnetic-field sensor, and the like.

Figure 3A:
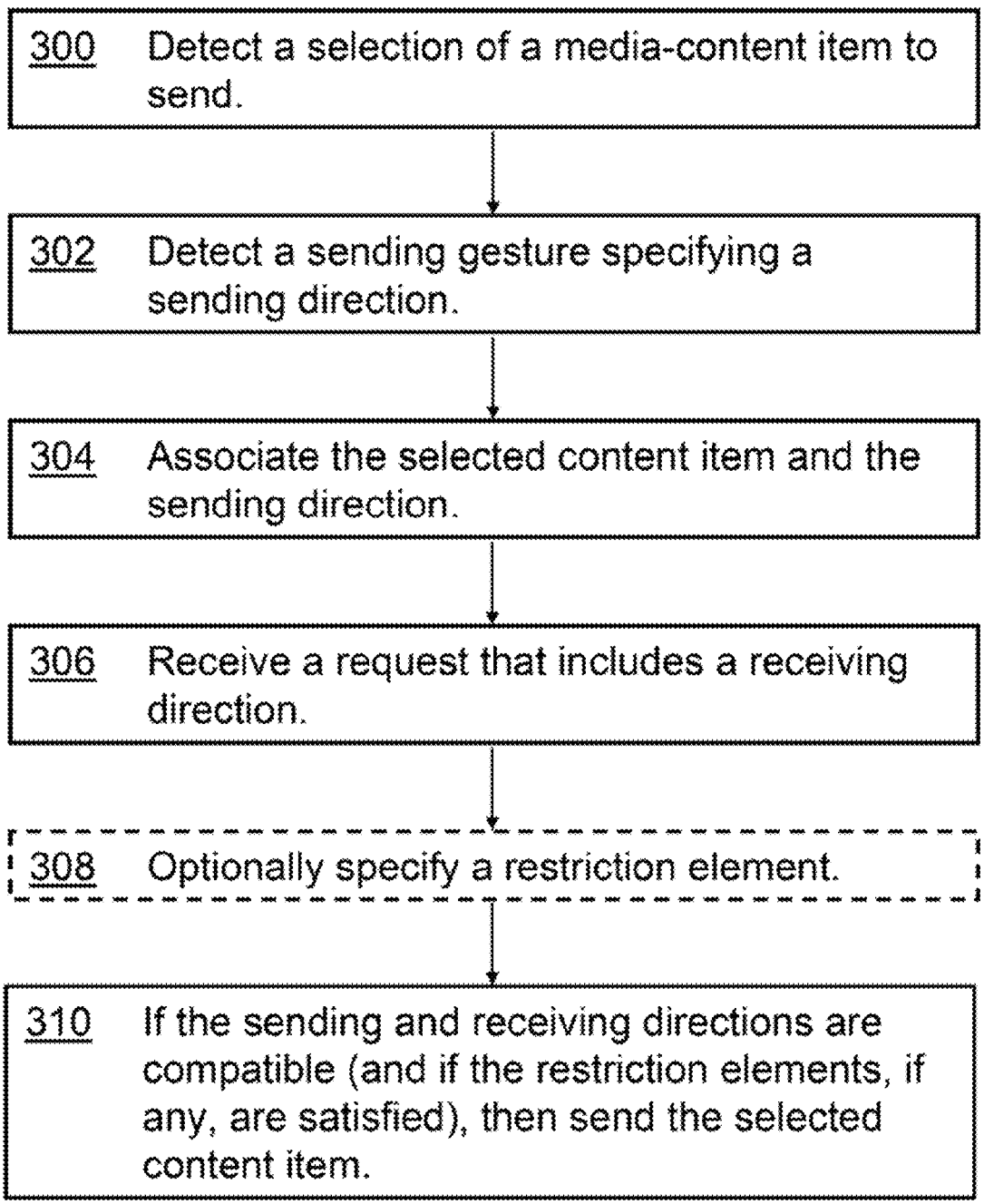
FIGS. 3a and 3b are flowcharts of representative methods for using a gesture to send content.

FIG. 3*a* presents a first method for sending a content item. In step 300, the user 102 uses any known technique for selecting a content item to send. He may, for example, touch an icon corresponding to the content item to select it. If he takes a picture with his portable communications device 104, and that picture is displayed on a screen of the device 104, then that picture may be selected by default until unselected. The user 102 may even select multiple content items, such as a directory and all its contents. In some cases, he can run a specific application on his device 104 that presents possible content items to him for his selection.

The user 102 then makes a "sending" gesture using his portable communications device 104 (step 302). The sending gesture specifies a sending direction. For example, he may pretend to throw his device 104 to the West. Position sensors (e.g., accelerometers, a compass, or a magnetic-field sensor 228) on the device 104 note the movement and send their data to the CPU 200 which interprets the gesture, recognizes it as a sending gesture, and notes the direction specified. In another example, he can select a content item by touching its icon on the display screen of his device 104 and move his finger as if to "flick" the icon in a specified direction. Other gestures are possible.

In addition to selecting a content item and specifying a sending direction, the user 102 may specify other characteristics of the sending. For clarity's sake, the discussion of these other characteristics is postponed until step 308, below.

The content item and the sending direction are associated in step 304. This is meant simply as shorthand for a memory operation. As discussed below, the content item may not be sent immediately, so it may be important to remember the association of the content item with the sending direction for later use.

In step 306, the user's portable communications device 104 receives a request that includes a receiving direction. As discussed in more detail below with respect to FIGS. 4*a* and 4*b*, a potential recipient made a receiving gesture that specifies a receiving direction. In the particular embodiment of FIG. 3*a*, that information is sent in a request and is received by the sender's device 104 in step 306.

While optional step 308 logically precedes step 310, for clarity's sake the discussion of step 308 follows that of step 310.

In step 310, the sending direction specified by the sender's sending gesture (step 302) and the receiving direction contained in the request received in step 306 are compared. If these two directions are "compatible" (as discussed below), then (if all other restriction elements from optional step 308 are satisfied) the selected content item is sent from the sender's portable communications device 104 to another device, generally the device that sent the request received in step 306. In a very simple example, if the content item is "thrown" to the West, and if the potential recipient's gesture indicates that it wishes to receive content coming from the East, then the sending and receiving directions are compatible, and the content item is sent.

The example just given, though useful, is perhaps too simple. More realistically, the sending process is associated with one or more optional "restriction elements" (step 308). First, there should be some allowance for directional variations. Rather than simply throwing to the West, for example, the user 102 (or the sending application itself) can specify that the content item is being "sprayed" out in directions from 45° North of West to 45° South of West. Similarly, the receiving direction of step 306 can come with an angular dispersion. These angles are indicated by the dotted lines in FIG. 1. When the directions are compared in step 310, any pair of directions within the two angular dispersions is considered to be "compatible." The angles can also be intentionally narrowed to exclude other recipients.

(Note that in general, the methods of the present disclosure do not require detecting the location or even the presence of another device in order to communicate with that device: A comparison of the sending and receiving directions is sufficient. However, location-detection can be added to the basic methods, for example when setting the angular dispersion or distance to exclude some potential recipients.)

A sending distance can be specified as a second restriction element, again limiting the range of potential recipients. This makes the present methods more robust than previous methods, especially in environments (e.g., indoors or in an environment with significant electrical interference) where location detection is unreliable.

Another potential restriction element is a time limit. According to aspects of the present disclosure, there is no requirement that the sending 104 and receiving 106 devices actually be physically near one another at the time of transmission. There is no need for the two devices 104, 106 to use a "handshake" to set up the potential transfer. (In these cases, an intermediary content server 110 can be used. Please see the discussion accompanying FIGS. 5a and 5b below.) Thus, the sender 102 can specify that the selected content item is available for reception for only, say, the next five minutes.

As a final example of a restriction element, known techniques of encryption, security, and privacy can be applied to the potential transfer. Thus, a potential recipient device 106 may need to identify itself to the sending device 104 before the content is transferred. The sender 102 himself may specify, e.g., in a profile setting, that content transferred using the present techniques can only go to those people identified in a contacts list on his device 104.

As mentioned above, the transfer of the content item in step 310 only proceeds if the restriction elements in place (if any) are satisfied.

In some embodiments, when the content item is sent is step 310, along with it is sent an identifier of the user 102 or of his sending device 104. This information can be used by the receiving device 106 as discussed below.

Figure 3B:
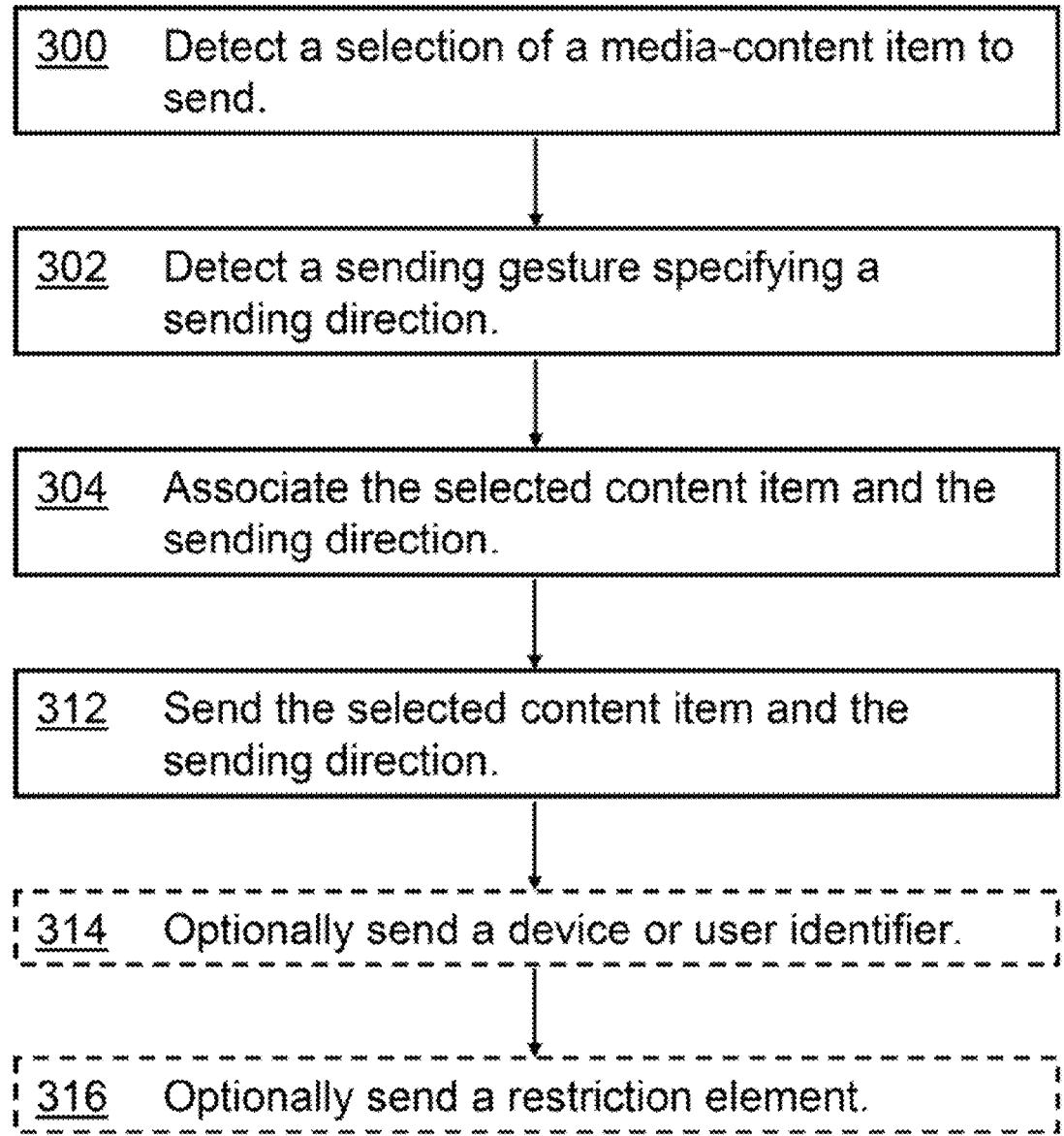

FIG. 3b presents another method for sending a content item. The first steps 300 through 304 are the same as in the method of FIG. 3a. Then, however, instead of receiving a reception request (as in step 306 of FIG. 3a), this method transmits the selected content item along with information about the sending direction in step 312. The implication is that the comparison of the sending and receiving directions (done in step 310 in the method of FIG. 3a) will be done by a device other than the sending device 104. (Some possibilities for those other devices are discussed below in reference to FIGS. 4 and 5.) To make sure that that device has all necessary information, the sender can also send an identification of the sender 102 or of his device 104 (optional step 314) and any restriction elements (optional step 316).

Figure 4A:
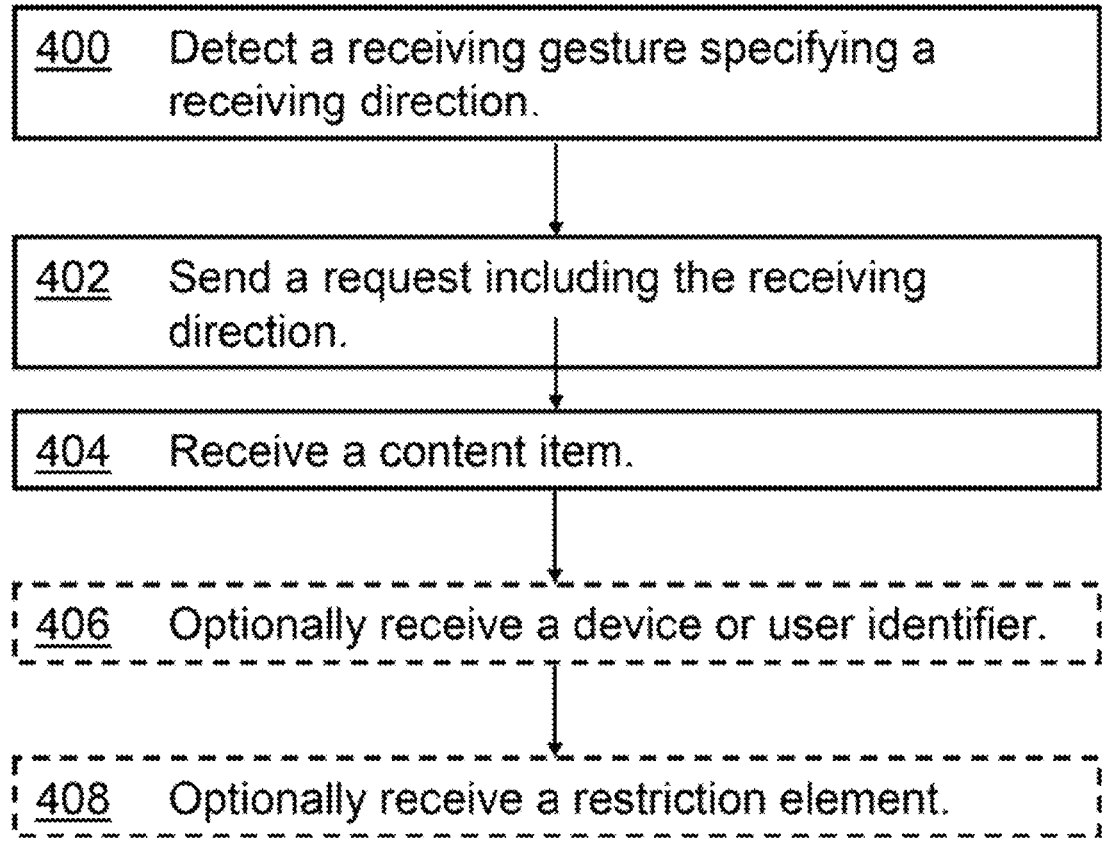

A potential receiving device 106 can perform the method of FIG. 4a. In step 400, the device 106 detects a receiving gesture that specifies a receiving direction. Gesture-detection can be performed using the techniques discussed above in relation to step 302 of FIG. 3a. However, there is no requirement that the receiving gesture be complementary to the sending gesture. Thus, the sender 102 may pretend to "throw" the selected content item, while the receiver can make a reverse "flick" on a touch-screen to receive it.

Note that there is no requirement that a potential recipient make the receiving gesture of step 400 in response to seeing the sender's sending gesture. There need be no "handshaking" either of devices or of people for the present techniques to work. Indeed, the sender 102 may make his sending gesture and then leave the premises long before the potential recipient makes her receiving gesture.

In step 402, the potential receiving device 106 sends a request that includes the receiving gesture. This may (or may not) be the same request received in step 306 of FIG. 3a. In any case, a content item is received in step 404. Note that in the particular method of FIG. 4a, the receiving device 106 does not need to compare the sending and receiving directions for compatibility. It is assumed that this comparison is done on another device, and that only a content item sent with a compatible direction is received in step 404.

In optional steps 406 and 408, the potential recipient device 106 receives other information such as a sender or device identifier and a restriction element. The potential recipient 106 can use this information in deciding whether or not to accept the content item received in step 404. For example, the potential recipient 106 may be configured to only accept content items from known senders 102. As another use of a restriction element, the content item may be received in an encrypted form, and only authorized recipients 106 are given access to the decryption key.

FIG. 4b presents another method for receiving a content item. A receiving gesture specifying a receiving direction is detected in step 400, as discussed above in reference to FIG. 4a. Then, in step 410, a content item is received along with its associated sending direction. This step may correspond to the sending step 312 of FIG. 3b. The receiving device 106 may also receive identification information and restriction elements in optional steps 406 and 408, also as discussed above. Finally, in step 412 the receiving device 106 compares the receiving direction detected in step 400 with the sending direction received in step 410. If they are compatible (please see the discussion of step 310 of FIG. 3a, above), then the content item is accepted (assuming that the restriction requirements, if any, are also satisfied).

In some cases, the content item is not transmitted directly from the sending device 104 to the receiving device 106. Instead, a content server 110 mediates the transmission. A first method usable by the content server 110 is illustrated in FIG. 5a. The method begins in step 500 when the content server 110 receives a content item and its associated sending direction. This step may correspond to the sender's sending step 312 of FIG. 3b.

In steps 502 and 504, the content server 110 receives the further information and restriction requirements, if any, sent by the sending device 104.

A request from a potential recipient 106 is received in step 506, the request including a receiving direction. This request may correspond to the request sent in step 402 of FIG. 4a. As in steps 310 of FIGS. 3a and 412 of FIG. 4b, the sending and receiving directions are compared and, if compatible (and if the restriction elements, if any, are satisfied), then the content item and associated information are sent to the potential recipient 106 in step 508. This sending may correspond to the receiving of step 404 of FIG. 4a.

Note that the request of step 506 may be received long after (or, theoretically, even before), the content item is received in step 500. That is, the presence of the content server 110 removes any necessity of concurrency between the methods of the sending 104 and receiving 106 devices.

Figure 5B:
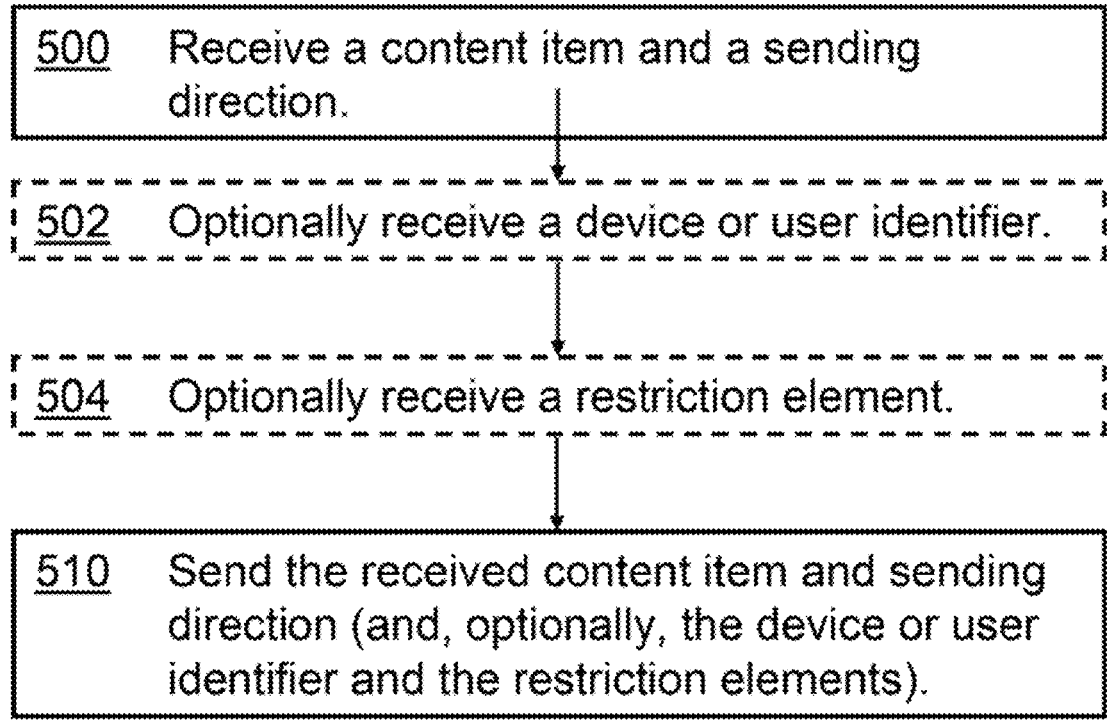

FIG. 5b presents a variant method practicable by the content server 110. Here, the content server 110 receives the content item, its associated sending direction, and any further information and restriction elements in steps 500 through 504, as discussed above. The content server 110 then sends all of this along in step 510. Presumably, the recipient of this information would compare sending and receiving directions for compatibility. (Please see the receiving method of FIG. 4b).

While FIGS. 3 through 5 present distinct methods, note that elements of these methods can be combined as necessary for different situations. So, for example, a sending device 104 would probably implement the methods of both FIGS. 3a and 3b, applying them as needed. As another example, a sender 102 may use one method when he wishes to restrict the distribution of his content and use another method to broadcast the content broadly, giving full control to the potential recipients to decide whether they wish to accept the content or not.

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A method for a content server to provide access to a content item, the method comprising:
   receiving, by the content server from a sending portable communications device distinct from the content server, the content item, a first sending direction, and a second sending direction, the first and second sending directions defining a first angle;
   receiving, by the content server from a receiving portable communications device, a request comprising a first receiving direction and a second receiving direction, the first and second receiving directions defining a second angle; and
   if at least a portion of a first area defined by the first angle and the first and second sending directions, and at least a portion of a second area defined by the second angle and the first and second receiving directions overlap within a predetermined distance of at least one of the sending and receiving portable communications devices then sending, by the content server to the receiving portable communications device, the content item.

2. The method of claim 1 wherein the content item comprises an element selected from the group consisting of: a social-networking post, a message, a file, a link to a file, an address, and a directory.

3. The method of claim 1 further comprising:
   receiving, from the sending portable communications device, an element selected from the group consisting of: an identifier of the sending portable communications device and an identifier of a user of the sending portable communications device; and
   sending, to the receiving portable communications device, the received element.

4. The method of claim 1 further comprising:
   receiving, from the sending portable communications device, a restriction element selected from the group consisting of: a time limit and a recipient-identification requirement;
   wherein sending is only performed if the received restriction element is satisfied.

5. The method of claim 1 further comprising:
   receiving, from the sending portable communications device, an angular dispersion restriction element; and
   detecting a direction of the receiving portable communications device with respect to the sending portable communications device;
   wherein sending is only performed if the detected direction satisfies the specified angular dispersion restriction element.

6. The method of claim 1 further comprising:
   receiving, from the sending portable communications device, a distance restriction element; and
   detecting a distance between the sending and receiving portable communications devices;
   wherein sending is only performed if the detected distance satisfies the specified distance restriction element.

7. A content server configured for providing access to a content item, the content server comprising:
   a communications interface configured for receiving, from a sending portable communications device distinct from the content server, the content item, a sending direction, and sending dispersion angle, the communication interface configured for receiving, from a receiving portable communications device, a request comprising a receiving direction and a receiving dispersion angle; and
   a processor operatively connected to the communications interface and configured for:
      if the sending and receiving directions are compatible and the sending and receiving dispersion angles overlap within a predetermined distance of at least one of the sending and receiving portable communications devices, then sending, via the communications interface to the receiving portable communications device, the content item.

8. The content server of claim 7 wherein the content server is selected from the group consisting of: a personal communications device, a mobile telephone, a personal digital assistant, a tablet computer, a gaming controller, a set-top box, a compute server, and a coordinated group of compute servers.

9. A method for a content server to provide access to a content item, the method comprising:
   receiving, by the content server from a sending portable communications device distinct from the content server, the content item, a first sending direction, and a second sending direction, the first and second sending directions defining a first angle;
   receiving, by the content server from a receiving portable communications device distinct from the content server, a first receiving direction and a second receiving direction, the first and second receiving directions defining a second angle;
   comparing, by the content server, the first and second sending directions and the first and second receiving directions; and
   sending, by the content server to a receiving portable communications device, the received content item when the first and second sending directions and the first and second receiving directions overlap within a predetermined distance of at least one of the sending and receiving portable communications devices based on the comparing.

10. The method of claim 9 wherein the content item comprises an element selected from the group consisting of: a social-networking post, a message, a file, a link to a file, an address, and a directory.

11. The method of claim 9 further comprising:
   receiving, from the sending portable communications device, an element selected from the group consisting of: an identifier of the sending portable communications device and an identifier of a user of the sending portable communications device, wherein the comparing is based on the received element.

12. The method of claim 1 further comprising:
   receiving, from the sending portable communications device, a restriction element selected from the group consisting of: a time limit, a recipient-identification requirement, an angular dispersion, and a distance, wherein the comparing is based on the received restriction element.

13. A content server configured for providing access to a content item, the content server comprising:
   a communications interface configured for receiving, from a sending portable communications device distinct from the content server, the content item, a first sending direction, and a second sending direction, the first and second sending directions defining a first angle, the communication interface configured for receiving, from a receiving portable communications device distinct from the content server, a first receiving direction and a second receiving direction, the first and second receiving directions defining a second angle; and
   a processor operatively connected to the communications interface and configured for:
      comparing, by the content server, the first and second sending directions and the first and second receiving directions; and
      sending, via the communications interface to a receiving portable communications device, the received content item when at least a portion of a first area defined by the first angle and the first and second sending directions and at least a portion of a second area defined by the second angle and the first and second receiving directions overlap within a predetermined distance of at least one of the sending and receiving portable communications devices based on the comparing.

14. The content server of claim 13 wherein the content server is selected from the group consisting of: a personal communications device, a mobile telephone, a personal digital assistant, a tablet computer, a gaming controller, a set-top box, a compute server, and a coordinated group of compute servers.

15. The method of claim 1 further comprising:
   receiving together with the first and second sending directions, by the content server from the sending portable communications device, a first indication of a sending gesture;
   receiving together with the first and second receiving directions, by the content server from the receiving portable communications device, a second indication of a receiving gesture,
   wherein the content item is sent if the first and second sending directions and the first and second receiving directions are compatible and if the sending gesture and the receiving gesture are compatible.

* * * * *